(12) United States Patent
Wheeler (10) Patent No.: US 6,277,509 B1
(45) Date of Patent: Aug. 21, 2001

(54) HYDRIDE BED WATER RECOVERY SYSTEM FOR A FUEL CELL POWER PLANT

(75) Inventor: Douglas J. Wheeler, Tolland, CT (US)

(73) Assignee: International Fuel Cells LLC, South Windsor, CT (US)

(*) Notice: Subject to any disclaimer, the term of this patent is extended or adjusted under 35 U.S.C. 154(b) by 0 days.

(21) Appl. No.: 09/290,132

(22) Filed: Apr. 12, 1999

(51) Int. Cl.$^7$ ...................................................... H02M 8/06
(52) U.S. Cl. .................................. 429/17; 429/20; 429/26
(58) Field of Search ............................... 429/17, 19, 20, 429/26

(56) References Cited

U.S. PATENT DOCUMENTS

| | | | |
|---|---|---|---|
| 4,155,712 | * 5/1979 | Taschek | 422/239 |
| 4,463,063 | * 7/1984 | Adlhart | 429/19 |
| 4,769,297 | 9/1988 | Reiser et al. | 429/7 |
| 5,302,471 | * 4/1994 | Ito et al. | 429/26 X |
| 5,503,944 | 4/1996 | Meyer et al. | 429/13 |
| 5,527,632 | * 6/1996 | Gardner | 429/17 X |
| 5,573,864 | 11/1996 | Van Dine et al. | 429/13 |
| 5,700,595 | 12/1997 | Reiser | 429/13 |
| 5,728,483 | * 3/1998 | Fujitani et al. | 429/19 X |

FOREIGN PATENT DOCUMENTS 53-96438 * 8/1978 (JP) .

OTHER PUBLICATIONS

A printed article entitled "Hydrogen Sponge Alloys", printed in "Technical Brochure 56", published on Dec. 4, 1977, by Molycorp, Inc., of White Plains, NY, 10604, U.S.A.

* cited by examiner

Primary Examiner—Stephen Kalafut
(74) Attorney, Agent, or Firm—Malcolm J. Chisholm, Jr.

(57) ABSTRACT

The invention is a hydride bed water recovery system for a fuel cell power plant that has at least one fuel cell having an electrolyte between anode and cathode electrodes for producing an electric current from a reducing fluid and an oxidant stream. A coolant loop directs a coolant fluid from a coolant reservoir through a coolant passage to the fuel cell and back to the reservoir. A process exhaust passage receives a cathode exhaust stream from the fuel cell and directs the stream away from the fuel cell and into a hydride bed cooler that passes the stream in heat exchange relationship with a condensing hydride bed of the cooler so that the bed cools the process exhaust stream to condense water out of the stream. In a preferred embodiment, the hydride bed cooler is a two-pair hydride bed cooler that includes a first pair and a second pair of hydride beds, and each pair includes a high temperature hydride bed, and a low temperature hydride bed so that each pair of hydride beds operates in alternating regeneration and cooling modes.

19 Claims, 3 Drawing Sheets

REGENERATION MODE

FIG.3B

COOLING MODE

HYDRIDE BED WATER RECOVERY SYSTEM FOR A FUEL CELL POWER PLANT

TECHNICAL FIELD

The present invention relates to fuel cell power plants that operate at about ambient pressures and are suited for usage in transportation vehicles, as portable power plants, or as stationary power plants, and the invention especially relates to a fuel cell power plant that utilizes a condensing heat exchanger to enhance water recovery and self-sufficiency and energy efficiency during hot weather operation of the plant.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame that defines manifolds for directing flow of reducing, oxidizing, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane as the electrolyte, the hydrogen electrochemically reacts at a surface of an anode catalyst to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is a proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention. Furthermore, high electrochemical activity of PEM cells results in high power density which minimizes weight and volume of the cell. As is well-known however, PEM cells have significant limitations especially related to liquid water transport to, through and away from the PEM, and related to simultaneous transport of gaseous reducing and oxidant fluids to and from the electrodes adjacent opposed surfaces of the PEM. The prior art includes many efforts to minimize the effect of those limitations.

In operation of a fuel cell employing a PEM, the membrane is saturated with water, and the anode electrode adjacent the membrane must remain wet. As hydrogen ions produced at the anode electrode transfer through the electrolyte, they drag water molecules with them from the anode to the cathode. Water also transfers back to the anode from the cathode by osmosis. Product water formed at the cathode electrode is removed by evaporation or entrainment into a circulating gaseous stream of oxidant, or by capillary action into and through a porous coolant transport plate adjacent the cathode. The porous coolant transport plates are part of a coolant loop that directs liquid water from a supply or reservoir of coolant through a coolant passage to the transport plates adjacent the cathode electrode, and back to the coolant water supply. The coolant plates thereby also serve to remove heat from the electrolyte and electrodes, as is well-known in the art, and described in more detail in U.S. Pat. Nos. 4,769,297 and 5,503,944 assigned to the assignee of the present invention.

In operation of PEM fuel cells, it is critical that a proper water balance be maintained between a rate at which water is produced at the cathode electrode and rates at which water is removed from the cathode and at which liquid water is supplied to the anode electrode. An operational limit on performance of a fuel cell is defined by an ability of the cell to maintain the water balance as electrical current drawn from the cell into the external load circuit varies and as an operating environment of the cell varies. For PEM fuel cells, if insufficient water is returned to the anode electrode, adjacent portions of the PEM electrolyte dry out thereby decreasing the rate at which hydrogen ions may be transferred through the PEM and also resulting in cross-over of the reducing fluid leading to local over heating. Similarly, if insufficient water is removed from the cathode, the cathode electrode may become flooded effectively limiting oxidant supply to the cathode and hence decreasing current flow. Additionally, if too much water is removed from the cathode by the gaseous stream of oxidant, the cathode may dry out limiting ability of hydrogen ions to pass through the PEM, thus decreasing cell performance.

As fuel cells have been integrated into power plants developed to power transportation vehicles such as automobiles, trucks, buses, etc., maintaining an efficient water balance within the power plant has become a greater challenge because of a variety of factors. For example, with a stationary fuel cell power plant, water lost from the plant may be replaced by water supplied to the plant from off-plant sources. With a transportation vehicle, however, to minimize weight and space requirements of a fuel cell power plant the plant must be self-sufficient in water to be viable. Self-sufficiency in water means that enough water must be retained within the plant to offset losses from reactant fluids exiting the plant in order to efficiently operate the plant. Any water exiting the plant through a plant exhaust stream consisting of a cathode exhaust stream of gaseous oxidant and/or an anode exhaust stream of gaseous reducing fluid must be balanced by water produced electrochemically at the cathode electrode and water retained within the plant.

For example, an ambient pressure, gasoline powered PEM fuel cell must be self-sufficient in water to be a viable power source for vehicles. Such a power source requires fuel processing components to process the gasoline into a hydrogen rich reactant fluid. The fuel processing components use water in the form of steam in a boiler as a reactant in processing the gasoline, and the water for the fuel processing components must be supplied from water produced at the cathode in the fuel cell as a result of the above described electrochemical reaction. As is well-known however, the water produced at the cathode electrode is swept from the cell within the cathode exhaust stream and within a combustor exhaust stream passing out of an anode exhaust combustor that burns the anode exhaust to provide heat to a boiler. For convenience, the cathode exhaust and/or combined cathode exhaust and combusted anode exhaust exiting the plant will be referred to as a process exhaust stream. It is known to recover some of the water in the process exhaust stream by passing the process exhaust stream through a condensing heat exchanger to cool the stream and thereby condense the water out of the stream. The condensed water is then accumulated and directed to the fuel cell coolant loop and the fuel processing components as required to maintain the plant in water balance.

An example of a PEM fuel cell power plant using a condensing heat exchanger is shown in U.S. Pat. No. 5,573,866 that issued on Nov. 12, 1996 to Van Dine et al., and is assigned to the assignee of the present invention, and which patent is hereby incorporated herein by reference. Many other fuel cell power plants that use one or more condensing heat exchangers are well-known in the art, and they typically use ambient air streams as a cooling fluid passing through the exchanger to cool the plant exhaust streams. In Van Dine et al., the heat exchanger is used to cool an exhaust stream exiting a cathode chamber housing the cathode electrode. Prior to entering the cathode housing, the same stream provides air as the oxidant for the cathode electrode, and upon leaving the chamber the stream includes evaporated product water and some portion of methanol, the reducing fluid, that has passed through the PEM. The condensing heat exchanger passes the process exhaust stream in heat exchange relationship with a stream of cooling ambient air, and then directs condensed methanol and water indirectly through a piping system back to an anode side of the cell.

While condensing heat exchangers have enhanced water balance and energy efficiency of ambient fuel cell power plants, the heat exchangers encounter decreasing water recovery efficiency as ambient temperatures increase. Where the power plant is to power a transportation vehicle such as an automobile, the plant will be exposed to an extremely wide range of ambient temperatures. For example where an ambient air cooling fluid passes through a heat exchanger, performance of the exchanger will vary as a direct function of the temperature of the ambient air because decreasing amounts of liquid precipitate out of power plant exhaust streams as the ambient air temperature increases. Additionally, if the ambient temperatures approximate operating temperatures of the fuel cell, heat rejection capacities per unit area of any power plant heat exchangers will decrease dramatically, mandating larger heat exchangers.

An additional complication of known fuel cell power plants designed for use in transportation vehicles is also related to fluctuations in ambient air conditions. Fuel cells of such plants typically utilize ambient air as the oxidant directed to the cathode electrode and as a cooling fluid for the condensing heat exchanger, as referred to above. Such hot, dry ambient air raises a temperature and dewpoint of the plant or process exhaust well above process exhaust stream dewpoints necessary to achieve fuel cell water balance. For example, a fuel cell may require its process exhaust stream dewpoint to be at or below 105 degrees fahrenheit (°F.). But, where the ambient temperature is greater than 105° F., water balance cannot be achieved using an ambient cooling fluid cooled condensing heat exchanger at ambient pressure.

Consequently, many efforts have been undertaken to prevent excess water loss resulting in drying out of the cathode or anode electrode and adjacent electrolyte especially in PEM fuel cells, including: directing liquid condensate from condensing heat exchangers to humidify gaseous reactant and oxidant streams entering the cell; adding porous support layers and water transport plates in fluid communication with the electrodes for movement of coolant water through adjacent cells; generating a pressure differential on the anode side of the cell wherein gaseous reducing fluids are maintained at a slightly higher pressure than coolant water and anode supply water passing through the porous support layers adjacent reducing gas distribution channels so that the pressure differential assists water transport through the porous support layers and cell; and, increasing air utilization by the cathode through decreasing volumetric flow of the oxidant stream by the cathode. Such efforts at maintaining efficient water balance involve additional cost, weight, volume burdens, fuel cell performance penalties, and often require complicated control apparatus.

An alternative approach to enhancing water balance for fuel cell power plants in transportation vehicles is to continuously pressurize the cell and related components to increase reactant concentrations in high pressure gaseous streams and reduce volumetric flow through the cell and thereby reduce water loss through plant exhaust streams. Such continuously pressurized fuel cell power plants, however, require additional cost, weight and control apparatus in providing appropriate pressure housings and controls, and pressurized plants require additional energy derived from the plant to operate pressurizing pumps, valves, fans, etc., and are not known to be practical for portable power plants.

Accordingly, known plants that employ ambient air as the cathode oxidant, that use ambient air for condensing heat exchangers, or that continuously pressurize the fuel cell and related components are incapable of maximizing an efficient water balance and minimizing operating energy requirements because of their above described characteristics. It is therefore highly desirable to produce a fuel cell power plant that minimizes operating energy requirements to maintain the plant in water balance during both normal and periodic hot weather utilization of the plant.

DISCLOSURE OF THE INVENTION

The invention is a hydride bed water recovery system for a fuel cell power plant. The system includes: a fuel cell power plant with at least one fuel cell having an electrolyte between anode and cathode electrodes for producing an electric current from a reducing fluid and an oxidant stream; a coolant loop that directs a coolant fluid from a coolant reservoir through a coolant passage to the fuel cell and back to the reservoir; a process exhaust passage that receives a cathode exhaust stream from a cathode exhaust passage in fluid communication with the cathode electrode, wherein the process exhaust passage directs the cathode exhaust stream as a process exhaust stream away from the fuel cell; a hydride bed cooler that receives the process exhaust stream from the process exhaust passage and passes the process exhaust stream in heat exchange relationship with the hydride bed cooler so that a condensing hydride bed of the cooler cools the process exhaust stream to condense water out of the stream; and a condensed water return line secured between the hydride bed cooler and the coolant loop that directs water condensed from the process exhaust stream into the coolant loop. The cathode exhaust stream may be combined in the process exhaust passage with a combusted anode exhaust stream to form the process exhaust stream.

In a preferred embodiment, the hydride bed cooler is a two-pair hydride bed cooler that includes a first pair and a second pair of hydride beds, and each pair includes a bed containing a high temperature hydride, and a bed containing a low temperature hydride. Each pair of hydride beds operates in alternating regeneration and cooling modes, so that when the first pair is in a regeneration mode, the second pair is in a cooling mode, and when the first pair is in a cooling mode, the second pair is in a regeneration mode. To facilitate the regeneration mode of a pair of the hydride beds by effecting transfer of hydrogen from the high temperature bed to the low temperature bed of the pair, a high temperature heat supply is directed from a high temperature side of the coolant loop to a high temperature bed containing the high temperature hydride, and a low temperature heat supply is directed from a low temperature side of the coolant loop to a low temperature bed containing the low temperature hydride. To facilitate the cooling mode of a pair of the hydride beds by effecting transfer of hydrogen from the low temperature bed to the high temperature bed of the pair, the low temperature heat supply is directed to the high temperature bed from the low temperature side of the coolant loop. When a pair of the hydride beds is operating in the cooling mode, the process exhaust stream is directed in heat exchange relationship with the low temperature or condensing bed of the pair, so that heat within the process exhaust stream is drawn into the low temperature bed to cool the process exhaust stream, thereby effecting condensation of water vapor in the stream.

Whenever the low temperature bed of the hydride pair operating in the cooling mode, for example the first pair, is incapable of further cooling, the process exhaust stream is directed in heat exchange relationship with the low temperature or condensing bed of the second pair; the low temperature heat supply is directed to the high temperature bed of the second pair and the low temperature bed of the first pair; and, the high temperature heat supply is directed to the high temperature bed of the first pair, to thereby move the second pair of hydride beds into the cooling mode, and to simultaneously move the first pair of beds into the regeneration mode. Whenever the low temperature bed of the second pair is incapable of cooling the process exhaust stream, the above process is reversed, and the pairs of hydride beds thus alternate between cooling and regeneration modes to continuously cool the process exhaust stream. By utilizing the high and low temperature heat supplies from the high and low sides of the coolant loop, movement of hydrogen between the high and low temperature beds of the pairs of hydride beds is effected passively without need for compressors, pumps or related equipment that would require substantial parasitic power from the fuel cell power plant.

Accordingly, it is a general object of the present invention to provide a hydride bed water recovery system for a fuel cell power plant that overcomes deficiencies of the prior art.

It is a more specific object to provide a hydride bed water recovery system for a fuel cell power plant that requires minimum parasitic power demands to enhance water recovery in order to maintain the plant in water balance.

It is a further specific object to provide a hydride bed water recovery system for a fuel cell power plant that utilizes high and low temperature heat supplies of the plant to operate a two-pair hydride bed cooler.

It is yet an additional object to provide a hydride bed water recovery system for a fuel cell power plant that increases water recovery capacity of a fuel cell power plant without altering structural characteristics or operation of fuel cell and/or coolant loop components of the plant.

These and other objects and advantages of this invention will become more readily apparent when the following description is read in conjunction with the accompanying drawings.

DESCRIPTION OF THE PREFERRED EMBODIMENTS

Figure 1:
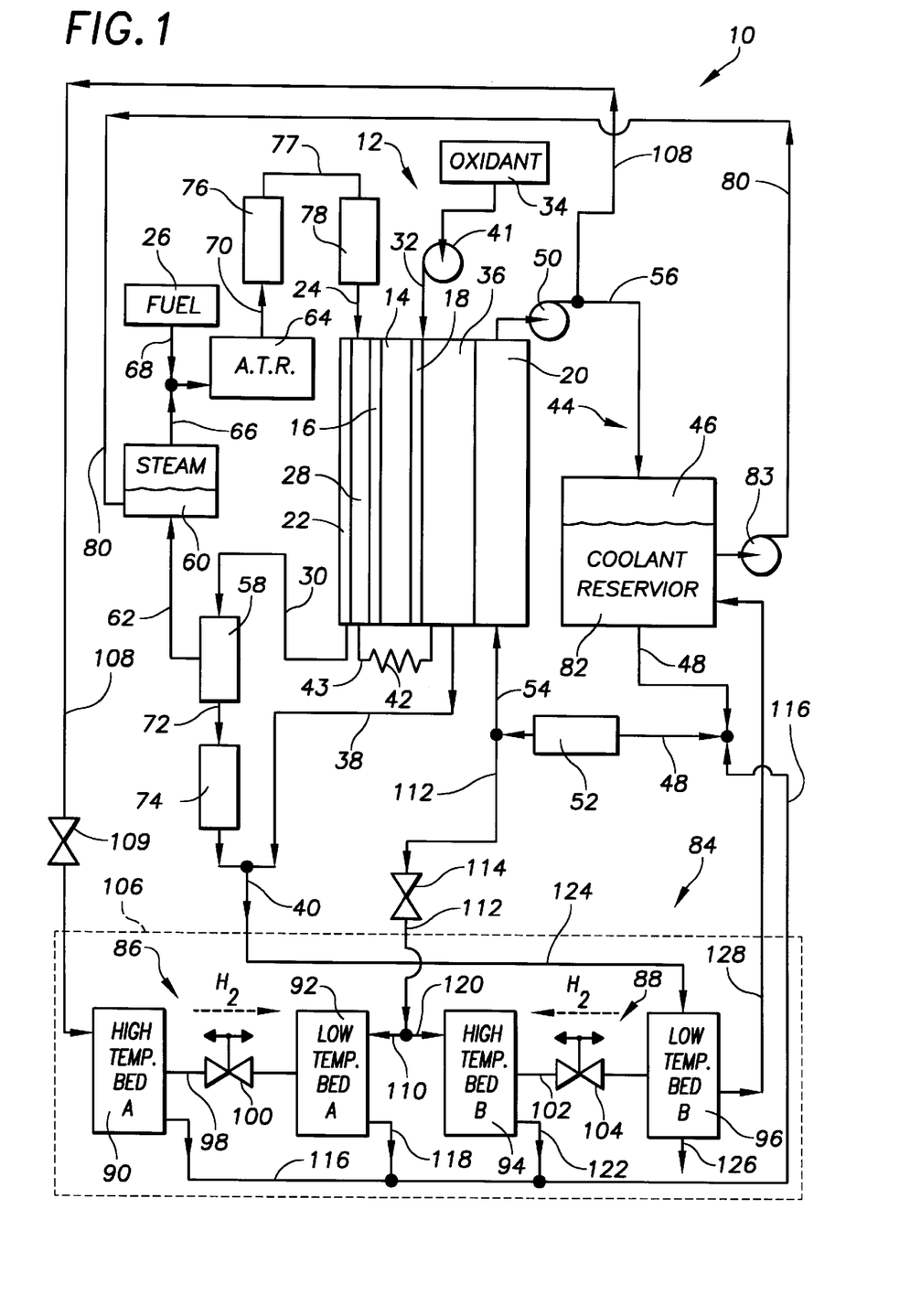
FIG. 1 is a schematic view of a hydride bed water recovery system for a fuel cell power plant constructed in accordance with the present invention showing a first pair of hydride beds operating in a regeneration mode, and a second pair of hydride beds operating in a cooling mode.

Referring to the drawings in detail, a hydride bed water recovery system for a fuel cell power plant constructed in accordance with the present invention is shown schematically in FIG. 1, and generally designated by the reference numeral 10. The system 10 includes at least one fuel cell means for producing an electric current from a reducing fluid and an oxidant stream, such as fuel cell 12. The fuel cell 12 includes an electrolyte 14 such as a proton exchange membrane ("PEM") or an acid or base electrolyte; an anode electrode 16, and a cathode electrode 18 on opposed sides of the electrolyte 14; and, a coolant transport plate 20 adjacent the cathode electrode 18 that may be porous plate, or a non-porous plate defining coolant passages such as in common heat exchangers. The fuel cell 12 may be combined with other virtually identical fuel cells (not shown) in a well-known manner to form a cell stack assembly enclosed within a frame structure 22 shown schematically in FIG. 1 that defines manifolds for directing a reducing fluid stream and oxidant stream into and out of the fuel cell 12 in a manner well-known in the art. A reducing fluid inlet 24 directs a hydrogen-rich reducing fluid from a fuel supply 26 (shown in FIG. 1 schematically with a label "FUEL" to facilitate understanding) into the cell 12 through fuel manifolding defined within the frame 22 so that the reducing fluid passes through an anode flow field 28 defined adjacent the anode electrode 16, and a reducing fluid outlet 30 directs the reducing fluid out of the fuel cell 12 as an anode exhaust stream. Similarly, an oxidant inlet 32 directs an oxidant stream such as air from an oxidant supply 34 (shown in FIG. 1 with a label "OXIDANT") into the cell 12 through oxidant manifolding defined within the frame 22 so that the oxidant stream passes through a cathode flow field 36 defined adjacent the cathode electrode 18, and a cathode exhaust passage 38 directs the oxidant stream out of the fuel cell 12 as a cathode exhaust stream into a process exhaust passage 40 where the cathode exhaust stream mixes with a burned or combusted anode exhaust stream to become a process exhaust stream. (It is noted that in, FIGS. 1 and 2, where a passage or fluid directing line meets with another passage or line to mix the fluids together, such as where cathode exhaust passage 38 joins process exhaust passage 40, the junction of the passages or lines is represented by a black circle or dot. Those circles simply represent standard piping fixtures, such as "T" joints, and do not represent valves, gates, or control fixtures.) The system 10 may also include a blower 41 positioned on the oxidant inlet 32 to variably accelerate flow of the oxidant into the cathode flow field 36. It is stressed that such a blower is of a capacity to only slightly increase operating pressures of the oxidant stream within the oxidant inlet 32 to a range of from atmospheric pressure to about 1.0 P.S.I. above atmospheric pressure, or from about 14.7 P.S.I.A. to about 15.7 P.S.I.A. As is common in the art, frame 22 also includes electrical conduction means for directing an electric current generated by the fuel cell 12 out of the power plant 10 to an electricity using device 42 such as an electric motor, through a standard external load circuit 43.

The system 10 also includes a coolant loop 44 that directs a coolant fluid such as water from a coolant reservoir 46 through a first coolant feed line 48, coolant heat exchanger 52 and second coolant feed line 54, into the coolant transport plate 20 in the fuel cell 12, and out of the cell in a coolant loop return line 56, through a coolant pump 50, and back to the coolant reservoir 46. The coolant pump 50 and coolant heat exchanger 52 may be a standard liquid pump and standard ambient air cooled radiator, such as common in the automotive industry, or may be other similar components well know in the fluid transport and heat exchange art. The coolant loop 44 and system 10 may also include additional components well-known in the fuel cell art, such as disclosed in U.S. Pat. No. 5,700,595 to Reiser, issued on Dec. 23, 1997 to the assignee of the present invention, which Patent is hereby incorporated herein by reference.

The fuel cell means of the hydride bed water recovery system 10 for a fuel cell power plant includes fuel processing component means for processing hydrocarbon fuels into reducing fluids appropriate for providing fuel to the anode electrode 16 of a fuel cell. Exemplary hydrocarbon fuels for powering such a fuel cell 12 include gasoline, diesel fuel, butane, propane, natural gas, methanol, ethanol, etc. The fuel processing component means may include: an anode exhaust combustor 58 that burns any excess reducing fluid such as hydrogen fed to the combustor 58 as the anode exhaust stream through the anode exhaust passage 30; a steam generator 60 (labelled "STEAM" in FIGS. 1 and 2) that receives heat directly from the combustor 58 in a heat conduit 62 to generate steam from a supply of water; a reformer 64 that may be an autothermal reformer (labelled "A.T.R." in FIGS. 1 and 2) that receives steam from the steam generator 50 through steam line 66 and that receives the hydrocarbon fuel directed from the fuel source 26 in fuel line 68; a reformed fuel discharge line 70 that directs the reformed fuel from the reformer 64 into the reducing fluid inlet 24; and a combustor exhaust passage 72 that directs a combusted anode exhaust stream from the anode exhaust combustor 58 through an anode heat exchanger 74 and into the process exhaust passage 40. Additional fuel processing component means may include a water shift reactor 76 connected by line 77 to a selective oxidizer 78, both of which are secured in fluid communication between the reformed fuel discharge line 70 and the reducing fluid inlet 24 in order to minimize carbon monoxide levels in the reducing fluid stream entering the anode support layer 24, as is well-known in the art. The fuel processing component means also includes a water supply line 80 secured between the coolant reservoir 46 and the steam generator 60 to deliver water 82 to the generator 60, and the supply line 80 may be supported by a water supply pump 83.

Any unused hydrogen rich reducing fluid in the anode exhaust stream is ignited in the anode exhaust combustor 58 to increase heat generated by the steam generator 60 and to thereby render the anode exhaust stream leaving the combustor 58 and within the combustor exhaust and plant exhaust passages 72, 40 non-flammable as well as to maximize water generation. The combusted anode exhaust stream combines with the cathode exhaust stream in the plant exhaust passage 40 to become the process exhaust stream. The fuel processing component means may also include components that are well-known in conventional steam reforming, autothermal reforming of various chemical compounds, and partial oxidation reforming, all of which include a reformer component. The fuel processing components are of relatively conventional design that are generally well-known in the chemical processing arts wherein there is a need to generate hydrogen enriched fluid from common hydrocarbon sources. For example, autothermal reformers in such processes typically burn a portion of the fuel received in the fuel-steam mixture to reach temperatures approximating 1,700 degrees fahrenheit (hereafter "°F.").

Figure 2:
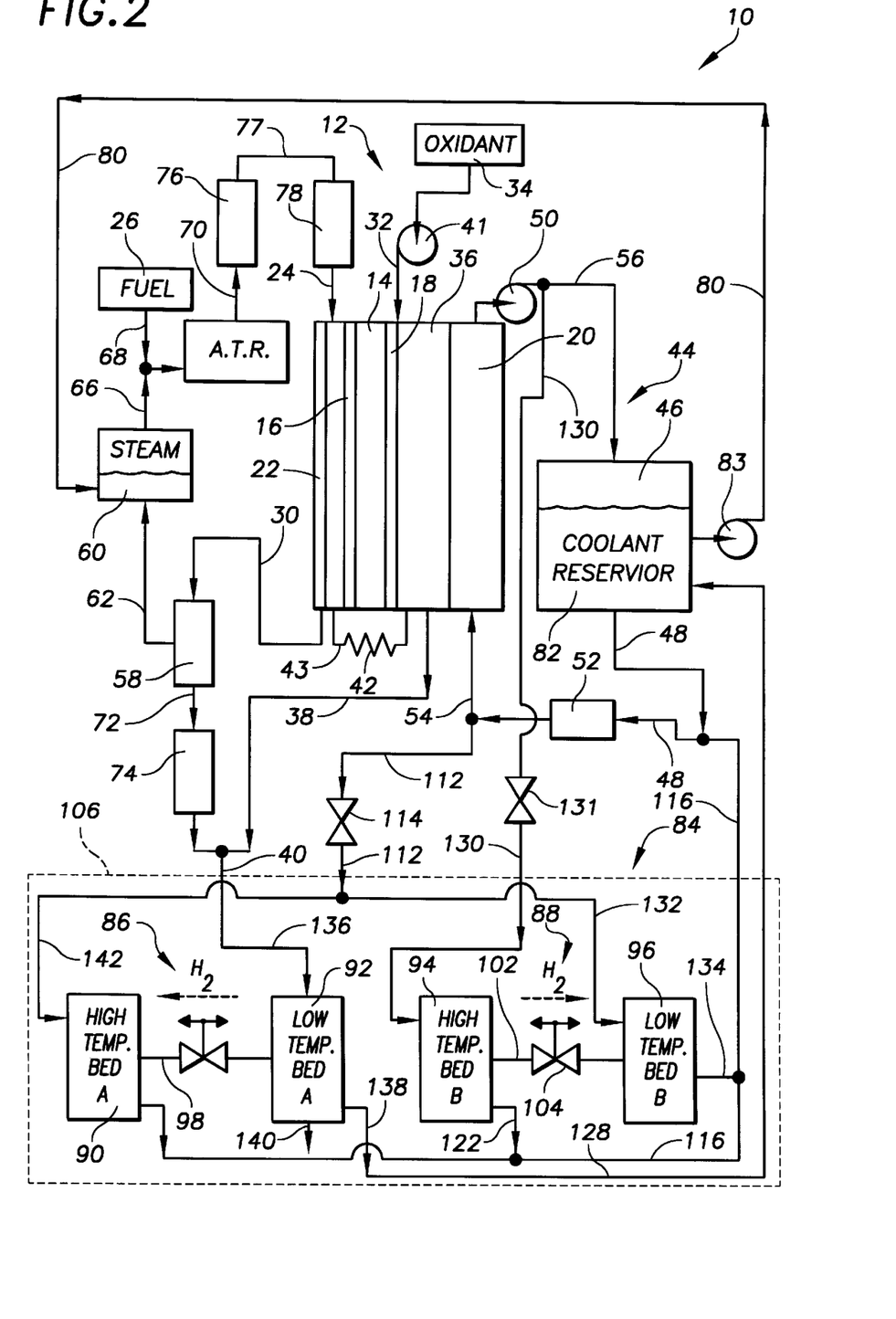
FIG. 2 is a schematic view of the FIG. 1 hydride bed water recovery system for a fuel cell power plant, but showing the first pair of hydride beds operating in a cooling mode, and the second pair of hydride beds operating in a regeneration mode.

The hydride bed water recovery system 10 for a fuel cell power plant also includes a hydride bed cooler means for cooling the process exhaust stream, such as a two-pair hydride bed cooler 84 that includes a first pair of hydride beds 86, and a second pair of hydride beds 88 as seen in FIGS. 1 and 2. The first pair of hydride beds 86 includes a first high temperature bed 90 (shown in FIGS. 1 and 2 with the words "HIGH TEMP. BED A", wherein the beds of the first pair of hydride beds 86 are designated with an "A", and the beds of the second pair 88 are designated with a "B" for ease of understanding), and a first low temperature condensing bed 92 (shown in FIGS. 1 and 2 with the designation "LOW TEMP. BED A"). The second pair of hydride beds includes a second high temperature bed 94 (shown in FIGS. 1 and 2 as "HIGH TEMP. BED B"), and a second low temperature condensing bed 96 (shown in FIGS. 1 and 2 as "LOW TEMP. BED B"). The first pair of hydride beds 86 also includes a first hydrogen passage 98 between the first high and low temperature beds 90, 92 that is dimensioned to permit passage of hydrogen gas between the first pair of beds 86, and the first hydrogen passage 98 includes a first hydrogen pressure valve 100 means for permitting one-way flow of hydrogen gas from a high pressure bed to a lower pressure bed, wherein the valve 100 may be set to specific operating pressures. Similarly the second pair of hydride beds 88 includes a second hydrogen passage 102 between the second high and low temperature beds 94, 96 dimensioned to permit passage of hydrogen gas between the second pair of beds 88, and the second hydrogen passage includes a second hydrogen pressure valve 104 means for permitting one-way flow of hydrogen gas from a high pressure bed to a lower pressure bed, wherein the valve 104 may be set to specific operating pressures.

The first and second high temperature beds 90, 94 of the two-pair hydride bed cooler 84 may include a rare earth intermetallic hydride compound, commonly referred to as a "hydrogen sponge alloy" of a high temperature form, such as lanthanum/nickel ($LaNi_5$). The first and second low temperature condensing beds may include a low temperature form of such a rare earth intermetallic hydride compound, such as $(La_{0.67}Nd_{0.25}Pr_{0.08})Ni_5$. The high temperature form and low temperature form of the rare earth intermetallic compounds are not limited to those two examples, but instead are limited in respect to each other, so that a high temperature form in the high temperature beds 90, 94 has higher temperature/pressure dissociation characteristics than the dissociation characteristics of a low temperature form in the low temperature condensing beds 92, 96. The dissociation characteristics of such hydrogen sponge alloys and the heat generation and cooling values resulting from hydrogen absorption and desorption caused by modest pressure/heat changes to pressure sealed containers of the alloys as utilized in cooling apparatus are well-known in the art, and, for example, described at pages 56-1 to 56-3 of an article entitled "HYDROGEN SPONGE ALLOYS", printed in "TECHNICAL BROCHURE 56", a written article published on Dec. 4, 1977 by Molycorp, Inc. of White Plains, N.Y. 10604 U.S.A., which article is hereby incorporated herein by reference.

As shown in FIGS. 1 and 2, the two-pair hydride bed cooler 84 may be housed within a cooler frame 106 (shown in hatched lines to avoid confusion with fluid passage solid lines), such as frames common to heat exchanger art, defining manifolds for directing the process exhaust into heat exchange relationship with the low temperature condensing beds 92, 96, and out of the cooler 84, and for directing heat supplies into heat exchange relationship with the four hydride beds 90, 92, 94, 96, and out of the cooler 84.

By use of the first and second pairs 86, 88 of the two-pair hydride bed cooler 84, one pair may be operating in a regeneration mode, while the other pair is operating in a cooling mode. For example, FIG. 1, shows the hydride bed system 10 wherein the two-pair hydride bed cooler 84 is operated so that the first pair 86 of hydride beds is in a regeneration mode, and the second pair of hydride beds 88 is in a cooling mode. When the first pair of hydride beds 86 is in a regeneration mode, a high temperature heat supply is directed into heat exchange relationship with the first high temperature bed 90 through first high temperature supply line 108 having a first high temperature flow control valve 109 (shown only in FIG. 1) secured in fluid communication with the coolant loop return line 56. The coolant loop return line is also a high temperature side of the coolant loop 44 because the coolant loop return line 56 passes coolant exiting directly from the fuel cell 12 removing heat therefrom, and directs the coolant into the coolant reservoir 46.

Simultaneously, a low temperature heat supply is directed into heat exchange relationship with the first low temperature condensing bed 92 through a first low temperature supply line 110 in fluid communication with a low temperature feed line 112, having a low temperature flow control valve 114, that receives the low temperature heat supply from the second coolant feed line 54. The second coolant loop feed line 54 is also a low temperature side of the coolant loop 44 because the coolant in the second coolant feed line 54 receives coolant prior to entry into the fuel cell, after the coolant has been cooled in the coolant reservoir 46 and coolant heat exchanger 52. The particular hydrogen sponge alloy in the first high temperature bed 90, the construction of the bed 90 to seal the alloy in the bed 90, and the heat exchange conduits defined around and through the bed 90 are selected, formed and dimensioned so that, upon receipt of the high temperature heat supply, hydrogen gas is desorbed from the alloy, passes through the first hydrogen passage 98 and hydrogen pressure valve 100 into the first low temperature condensing bed 92, as indicated by the "$H_2$" directional hatched arrow between the first pair of hydride beds 86 in FIG. 1. As hydrogen gas moves into the first low temperature condensing bed 92, it is absorbed into the particular low temperature form of a hydrogen sponge alloy sealed in the bed 92, to regenerate the bed 92.

The high temperature heat supply directed into the first high temperature bed 90 passes out of the bed 90 into a cooler return line 116 that directs the heat supply back to the first coolant feed line 48, and thereby back into the coolant loop 44. Heat is needed to sustain hydrogen desorption from the high temperature form of the hydrogen sponge alloy in the first high temperature bed 90. Thus, the high temperature heat supply is cooled as a result of passing through the bed 90. The low temperature heat supply directed in heat exchange relationship with the first low temperature condensing bed 92 passes through a first bed discharge line 118 into the cooler return line 116. As the low temperature form of the hydrogen sponge alloy in the first low temperature bed 92 absorbs hydrogen, heat is released and removed by the low temperature heat supply, back into the coolant loop 44.

While the first pair of hydride beds 86 is in the above-described regeneration mode, the second pair of hydride beds 88 is in the cooling mode, wherein the low temperature heat supply is directed from the low temperature feed line 112 into heat exchange relationship with the second high temperature bed 94 through a second low temperature feed line 120, and out of the bed 94 through a second bed discharge line 122 into the cooler return line 116. Simultaneously, the process exhaust stream within the process exhaust passage 40 is directed from the passage 40 through a first process exhaust passage extension 124 into heat exchange relationship with the second low temperature bed 96, and out of the system 10 through a first plant exhaust vent 126. The heat of the process exhaust stream forces desorption of hydrogen gas from the second low temperature condensing bed 96, which results in movement of heat from the process exhaust stream into the bed 96. The cooling of the process exhaust stream produces condensation of water vapor in the stream, and the condensed water is directed out of the second low temperature condensing bed 96 and back to the coolant loop 44 in a condensed water return line 128. The hydrogen gas desorbed from the second low temperature condensing bed 96 passes through the second hydrogen passage 102 and second hydrogen pressure valve, into the second high temperature bed 94 to be absorbed into the high temperature form of the hydrogen sponge alloy in the bed 94, as represented by the "$H_2$" hatched arrow line between the second pair of hydride beds 88 in FIG. 1. The low temperature heat supply passing through the second high temperature bed 94 removes heat generated by the absorption process as that heat supply moves back through the cooler return line 116 to the coolant loop 44.

As the amount of hydrogen capable of being desorbed from the second low temperature condensing bed 96 is exhausted, the temperature of the process exhaust stream exiting the bed 96 will increase, and the amount of condensed water directed from the bed to the coolant loop 44 will decrease. Standard fluid system control sensors may be then utilized to activate controls and valves (not shown) to switch the first pair of hydride beds 86 into the cooling mode, and the second pair of hydride beds 88 into the regeneration mode, as shown in FIG. 2. When the second pair of hydride beds 88 is in the regeneration mode, a second high temperature supply line 130 having a second high temperature flow control valve 131 (shown only in FIG. 2) directs the high temperature heat supply from the high temperature side 56 of the coolant loop into heat exchange relationship with the second high temperature bed 94 to add adequate heat/pressure to desorb hydrogen from the bed 94, through the second hydrogen passage 102 and pressure valve 104 and into the second low temperature condensing bed 96. The high temperature heat supply then passes through the second bed discharge line 122 and cooler return line 116 to the coolant loop. At the same time, a third low temperature supply line 132 directs the low temperature heat supply from the low temperature feed line 112 into heat exchange relationship with the second low temperature condensing bed 96 that is receiving and absorbing hydrogen gas from the second high temperature bed 94 (as indicated by the hatched "$H_2$" line between the second pair of hydride beds 88 in FIG. 2) in order to remove heat from the second low temperature condensing bed 96. The low temperature heat supply is then directed through a third bed discharge line 134 into the cooler return line 116 and back into the coolant loop 44.

Simultaneously, the first pair of hydride beds 86 is in the cooling mode (as seen in FIG. 2), wherein the process exhaust stream is directed from the process exhaust passage 40 through a second process exhaust passage extension 136 into heat exchange relationship with the first low temperature condensing bed 92. The heat of the process exhaust stream increases the pressure/temperature of the bed 92, thereby forcing desorption of hydrogen from the bed 92, and movement of the hydrogen through the first hydrogen passage 98 back into the first high temperature bed 90, as again shown by the "$H_2$" hatched arrow between the first pair of hydride beds 86 in FIG. 2. The desorption of the hydrogen in the first low temperature condensing bed 92 removes heat from the process exhaust stream, which causes condensation of water vapor in the stream. The condensed water is then directed from the process exhaust stream in heat exchange relationship with the bed 92 through condensed water return feed line 138 into the condensed water return line 128 back to the coolant loop 44, such as into the coolant reservoir 46. The process exhaust stream then passes out of the system 10 through a second plant exhaust vent 140. The low temperature heat supply is also directed from the low temperature feed line 112 through a fourth low temperature supply line 142 into heat exchange relationship with the first high temperature bed 90 to remove heat generated by absorption of the hydrogen into the bed 90, and the low temperature heat supply then travels through the cooler return line 116 back to the coolant loop 44.

During operation of the hydride bed water recovery system 10, the low temperature flow control valve 114 and first and second high temperature flow control valves 109, 131 are controlled in response to sensed temperatures of the high and low temperature heat supplies leaving the beds 90, 92, 94, 96 and/or the two-pair hydride bed cooler 84 to increase or decrease flow rates of the high and low temperature heat supply into the beds in order to maintain the beds within desired operating temperature and/or pressure ranges to enhance water recovery from the process exhaust stream passing in heat exchange relationship with either the first (FIG. 1) or second (FIG. 2) low temperature condensing beds 92, 96.

Whenever the capacity of the first low temperature condensing bed 92 to desorb hydrogen is depleted, the temperature of the process exhaust stream leaving the bed increases, and the amount of water condensed from the stream and returned to the coolant loop 44 decreases. Sensors then detect the increased temperature and/or decreased condensed water return, and control the flow of the process exhaust stream, and the flow of the high and low temperature heat supplies in order to place the first pair of hydride beds 86 back into the regeneration mode, and the second pair 88 back into the cooling mode, as described above, and shown in FIG. 1. By continuously alternating the two pairs of beds 86, 88 in such a manner between cooling and regeneration modes, the hydride bed system 10 maintains enhanced water recovery indefinitely.

By utilization of high and low temperature heat supplies directed from the high 56 and low 54 sides of the coolant loop 44, the above described embodiment of the hydride bed water recovery system 10 is able to avail itself of inherent efficiencies of a fuel cell power plant having the described coolant loop 44 to thereby minimize parasitic power demands from the power plant necessary to cycle the two-pair hydride bed cooler 84 through alternating regeneration and cooling modes. It is stressed however, that the hydride bed cooler means of the present invention is not limited to the described embodiment of a two-pair hydride bed cooler, but instead may include a single-pair hydride bed cooler to cool the process exhaust stream wherein power needed to cycle such beds between regeneration and cooling modes is derived from non-coolant loop 44 based sources, such as directly from electrical current generated by the fuel cell 12, or from heat sources originating in the fuel processing component means, or other traditional energy sources associated with well-known "Metal Hydride Air Conditioning [cooling] Systems" such as those manufactured by the Ergenics Company, of Ringwood, N.J., 07456 U.S.A. The hydride bed cooler means also includes common manifolding well-known in heat exchanger art for directing the process exhaust stream in alternating heat exchange relationship with a condensing bed of single pair, or the two-pair hydride bed cooler 84.

Additionally, the hydride bed cooler means may include a two-pair hydride bed such as the one described above, including alternative sources of high and/or low temperature heat supplies and/or pressure sources for cycling the pairs between regeneration and cooling modes, such as direct electrically generated heat supplies from the fuel cell; heat from the fuel processing component means; pressure pumps, or related pressure sources between the beds of each pair; or, other know heat and/or pressure supplies from known sources capable of cycling the pairs of beds between regeneration and cooling modes.

Figure 3A:
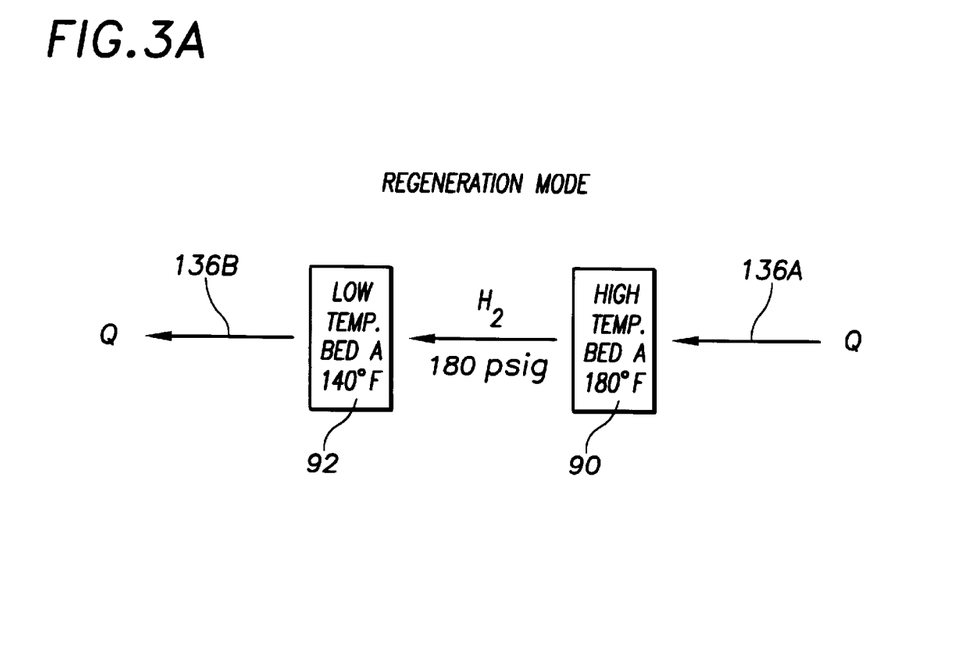
FIG. 3A is a schematic representation showing exemplary operating parameters of the FIG. 1 first pair of hydride beds operating in a regeneration mode.
Figure 3B:
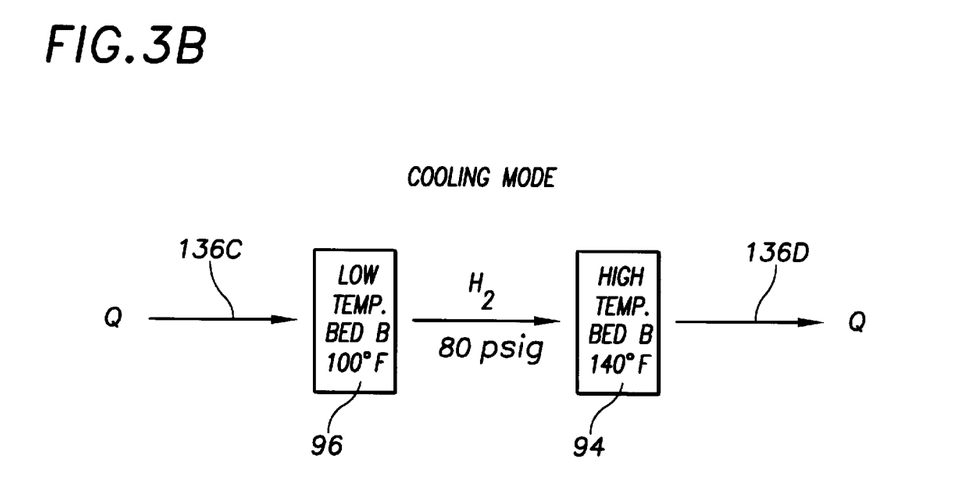
FIG. 3B is a schematic representation showing exemplary operating parameters of the FIG. 1 second pair of hydride beds operating in a cooling mode.

FIGS. 3A and 3B show in schematic form a predicted example of potential operating parameters of the two-pair hydride bed cooler 84 in a deployment shown in FIG. 1, wherein the high temperature form of the hydrogen sponge alloy within the first and second high temperature beds 90, 94 is lanthanum/nickel ($LaNi_5$), and the low temperature form of the hydrogen sponge alloy in the first and second low temperature beds 92, 96 is the modified lanthanum/nickel commonly referred to as a "Lundin/Lynch" rare earth nickel alloy ($La_{0.67}Nd_{0.25}Pr_{0.08})Ni_5$. In FIG. 3A, labelled "REGENERATION MODE", the first pair of hydride beds 86 is shown, wherein the first low temperature bed 92 is shown on the left side of the diagram labelled as "LOW TEMP. BED A 140° F." (meaning 140 degrees fahrenheit), and the first high temperature bed is shown on the right side of the diagram, labelled as "HIGH TEMP. BED A 180° F." The letter "Q" is associated with directional arrows 136A, 136B, 136C, 136D for ease of understanding direction of heat flow. The heat directional arrows show that in the predicted example heat moving into the first high temperature bed 90 at about 180° F. will force hydrogen to transfer at about 180 p.s.i.g. (pounds per square inch gas) into the first low temperature bed 92, wherein hydrogen will be absorbed into the hydrogen sponge alloy provided the bed is cooled by removal of heat generated by the absorption process so that the first low temperature bed 92 stays at about 140° F.

In FIG. 3B, the second pair of hydride beds 88 is shown with operating parameters when utilized in the cooling mode, wherein the second low temperature bed is labelled 96 "LOW TEMP. BED B 100° F.", and the second high temperature bed 94 on the right side of the diagram is labelled "HIGH TEMP. BED B 140° F." The predicted operating parameters shown in FIG. 3B indicate that when adequate heat is supplied to the second low temperature bed 96, such as by the process exhaust stream, to raise the temperature of the bed 96 to 100° F., hydrogen will desorb from the low temperature form of the hydrogen sponge alloy, and continuously move at approximately 80 p.s.i.g. to the second high temperature bed 94 and be absorbed into the high temperature sponge alloy in the bed 94, provided heat generated by the absorption is removed at a rate adequate to keep the second high temperature bed 94 at about 140° F. First and second hydrogen pressure valves 100, 104 are therefore controlled to facilitate flow of the hydrogen gas between the beds of first and second pairs 86, 88 of hydride beds at the described pressures depending upon whether the pair of beds is in the regeneration or cooling mode.

It can be seen that by adjusting a heat exchange capacity of the coolant heat exchanger 52, flow rates of the coolant pump 50, flow rates of the high temperature heat supply flowing through the first and second high temperature flow control valves 109, 131, and flow rates of the low temperature heat supply flowing through the low temperature flow control valve 114, the temperatures provided by the high 56 and low 54 temperature sides of the coolant loop 44 may be carefully adjusted to deliver the high and low temperature supplies to the two-pair hydride bed cooler 84 within narrow ranges for optimal performance. Similarly, by adjusting a heat exchange capacity of the anode exhaust heat exchanger 74 and flow rates of the oxidant blower 41, the temperature of the process exhaust stream delivered to the first and second low temperature condensing beds 92, 96 may be adjusted to enhance operational efficiencies of the two-pair hydride bed cooler 84 to thereby maximize water recovery of the system 10 while minimizing parasitic power requirements to operate the hydride bed water recovery system 10 for a fuel cell power plant of the present invention.

While the hydride bed water recovery system 10 for a fuel cell power plant has been described and illustrated with respect to a particular construction of a preferred embodiment, it will be understood by those skilled in the art that the system is not to be limited to the described and illustrated examples. For example, the many fluid transport passages have been described as "lines" and illustrated as separate components. However all such fluid transport passages, especially those within the two-pair hydride bed cooler 84 may simply be throughbores, or similar voids defined within the frame 22 of the fuel cell, or within the frame 106 of the two-pair hydride cooler 84. Additionally, the cooler and anode exhaust heat exchangers 52, 74 and four hydride beds 90, 92, 94, 96 are shown as separated from each other for ease of explanation. However, they may be stacked together or otherwise arranged to benefit from common ducting of ambient air, or similar heat exchange efficiencies. Accordingly, reference should be made primarily to the attached claims rather than the foregoing description to determine the scope of the invention.

What is claimed is:

1. A hydride bed water recovery system for a fuel cell power plant, comprising:
   a. at least one fuel cell means having an electrolyte between an anode electrode and a cathode electrode for producing an electric current from a reducing fluid and an oxidant stream;
   b. a process exhaust passage that receives a cathode exhaust stream from a cathode exhaust passage in fluid communication with the cathode electrode, wherein the process exhaust passage directs the cathode exhaust stream as a process exhaust stream out of the fuel cell means;
   c. a hydride bed cooler means in fluid communication with the process exhaust passage having manifolding for passing the process exhaust stream in heat exchange relationship with a water condensing hydride bed of the cooler means for cooling the process exhaust stream so that water vapor in the process exhaust stream condenses; and,
   d. a condensed water return line secured between the hydride bed cooler means and the fuel cell means that directs water condensed from the process exhaust stream into a coolant transport plate in the fuel cell means.

2. The hydride bed water recovery system of claim 1, wherein the process exhaust passage receives a combusted anode exhaust stream from an anode exhaust passage in fluid communication with an anode exhaust combustor that receives the anode exhaust from the anode electrode, and the combusted anode exhaust stream mixes with the cathode exhaust stream in the process exhaust passage to become the process exhaust stream.

3. The hydride bed water recovery system of claim 1, wherein the hydride bed cooler means further comprises a two-pair hydride bed cooler, including:
   a. a first pair of hydride beds in fluid communication with the process exhaust passage, the first pair including a first high temperature bed, a first low temperature condensing bed connected to the first high temperature bed by a first hydrogen passage, the first pair of hydride beds including manifolding dimensioned to pass the process exhaust stream received from the process exhaust passage in heat exchange relationship with the first low temperature condensing bed, so that water condensed from the process exhaust stream is directed into the condensed water return line; and,
   b. a second pair of hydride beds in fluid communication with the process exhaust passage, the second pair including a second high temperature bed, a second low temperature condensing bed connected to the second high temperature bed by a second hydrogen passage, the second pair of hydride beds including manifolding dimensioned to pass the process exhaust stream received from the process exhaust passage in heat exchange relationship with the second low temperature condensing bed, so that water condensed from the process exhaust stream is directed into the condensed water return line.

4. The hydride bed water recovery system of claim 3, wherein the first high temperature bed is in fluid communication through a first high temperature supply line with a high temperature heat supply and the first high temperature bed includes manifolding to pass the high temperature heat supply in heat exchange relationship with the first high temperature bed, and the second high temperature bed is in fluid communication through a second high temperature supply line with the high temperature heat supply and the second high temperature bed includes manifolding to pass the high temperature heat supply in heat exchange relationship with the second high temperature bed, and the first and second high temperature beds and first and second low temperature condensing beds are in fluid communication with a low temperature heat supply that is directed through manifolding in heat exchange relationship with the first and second high temperature beds and first and second low temperature condensing beds.

5. The hydride bed water recovery system of claim 4, wherein the system includes a coolant loop that directs a coolant from a coolant reservoir through a coolant feed line into the fuel cell means and through a coolant loop return line back to the coolant reservoir to cool the fuel cell means and the first and second high temperature supply lines are in fluid communication with the coolant loop return line, and the low temperature supply line is in fluid communication with the coolant feed line.

6. The hydride bed water recovery system of claim 4, wherein the first and second high temperature supply lines include at least one high temperature flow control valve, and the low temperature supply line includes a low temperature flow control valve to regulate flow of the high and low temperature heat supplies into the two-pair hydride bed cooler.

7. The hydride bed water recovery system of claim 5, wherein the system includes a water supply line secured between the coolant loop and fuel processing component means for processing hydrocarbon fuels into the reducing fluid so that water condensed within the two-pair hydride bed cooler and directed through the condensed water return line to the coolant loop may be directed through the water supply line into the fuel processing component means.

8. A hydride bed water recovery system for a fuel cell power plant, comprising:
  a. at least one fuel cell means having an electrolyte between an anode electrode and a cathode electrode for producing an electric current from a reducing fluid and an oxidant stream;
  b. a coolant loop having a coolant feed line that directs a coolant fluid from a coolant reservoir through the coolant feed line to the fuel cell means, and back through a coolant loop return line back to the coolant reservoir to cool the fuel cell means;
  c. a process exhaust passage that receives a cathode exhaust stream from a cathode exhaust passage in fluid communication with the cathode electrode, wherein the process exhaust passage directs the cathode exhaust stream as a process exhaust stream out of the fuel cell means;
  d. a two-pair hydride bed cooler means in fluid communication with the process exhaust passage having manifolding for passing the process exhaust stream in heat exchange relationship with first and second water condensing hydride beds of the cooler means for cooling the process exhaust stream so that water vapor in the process exhaust stream condenses; and
  e. a condensed water return line secured between the hydride bed cooler means and the coolant loop that directs water condensed from the process exhaust stream into the coolant loop.

9. The hydride bed water recovery system of claim 8, wherein the two-pair hydride bed cooler means includes:
  a. a first pair of hydride beds in fluid communication with the process exhaust passage, the first pair including a first high temperature bed, a first low temperature condensing bed connected to the first high temperature bed by a first hydrogen passage, the first pair of hydride beds including manifolding dimensioned to pass the process exhaust stream received from the process exhaust passage in heat exchange relationship with the first low temperature condensing bed, so that water condensed from the process exhaust stream is directed into the condensed water return line; and,
  b. a second pair of hydride beds in fluid communication with the process exhaust passage, the second pair including a second high temperature bed, a second low temperature condensing bed connected to the second high temperature bed by a second hydrogen passage, the second pair of hydride beds including manifolding dimensioned to pass the process exhaust stream received from the process exhaust passage in heat exchange relationship with the second low temperature condensing bed, so that water condensed from the process exhaust stream is directed into the condensed water return line.

10. The hydride bed water recovery system of claim 9, wherein the process exhaust passage receives a combusted anode exhaust stream from an anode exhaust passage in fluid communication with an anode exhaust combustor that receives the anode exhaust from the anode electrode, and the combusted anode exhaust stream mixes with the cathode exhaust stream in the process exhaust passage to become the process exhaust stream.

11. The hydride bed water recovery system of claim 10, wherein the first high temperature bed is in fluid communication through a first high temperature supply line with a high temperature heat supply and the first high temperature bed includes manifolding to pass the high temperature heat supply in heat exchange relationship with the first high temperature bed, and the second high temperature bed is in fluid communication through a second high temperature supply line with the high temperature heat supply and the second high temperature bed includes manifolding to pass the high temperature heat supply in heat exchange relationship with the second high temperature bed, and the first and second high temperature beds and first and second low temperature condensing beds are in fluid communication with a low temperature heat supply that is directed through manifolding in heat exchange relationship with the first and second high temperature beds and first and second low temperature condensing beds.

12. The hydride bed water recovery system of claim 11, wherein the first and second high temperature supply lines are in fluid communication with the coolant loop return line, and the low temperature supply line is in fluid communication with the coolant feed line.

13. The hydride bed water recovery system of claim 12, wherein the first and second high temperature supply lines include at least one high temperature flow control valve, and the low temperature supply line includes a low temperature f low control valve to regulate flow of the high and low temperature heat supplies into the two-pair hydride bed cooler.

14. The hydride bed water recovery system of claim 13, wherein the system includes a water supply line secured between the coolant loop and fuel processing component means for processing hydrocarbon fuels into the reducing fluid so that water condensed within the two-pair hydride bed cooler and directed through the condensed water return line to the coolant feed line of the coolant loop may be directed through the water supply line into the fuel processing component means.

15. A method of operating a hydride bed water recovery system for a fuel cell power plant having at least one fuel cell for producing an electric current from a reducing fluid and an oxidant stream, and having a coolant loop that directs a coolant fluid from a coolant reservoir through a coolant feed line to the fuel cell to cool the fuel cell and out of the fuel cell in a coolant loop return line back to the reservoir, the method comprising the steps of:
  a. directing a process exhaust stream passing out of the fuel cell into heat exchange relationship with a water condensing hydride bed of a hydride bed cooler; and,
  b. directing water condensed from the process exhaust stream in heat exchange relationship with the water condensing hydride bed of the cooler through a condensed water return line from the hydride bed cooler to the coolant loop.

16. The method of operating the hydride bed water recovery system of claim 15, comprising the further step of alternately directing the process exhaust stream in heat exchange relationship between a first low temperature condensing bed of a first pair of hydride beds and a second low temperature condensing bed of a second pair of hydride beds of the hydride bed cooler.

17. The method of operating the hydride bed water recovery system of claim 16, comprising the further steps of directing a high temperature heat supply in heat exchange relationship with a first high temperature bed of the first pair of hydride beds and directing a low temperature heat supply in heat exchange relationship with a first low temperature condensing bed of the first pair of hydride beds of the cooler to place the first pair of beds in a regeneration mode, and directing the low temperature heat supply in heat exchange relationship with a second high temperature bed of the second pair of hydride beds while passing the process exhaust stream in heat exchange relationship with a second low temperature condensing bed of the second pair of hydride beds of the cooler to place the second pair of beds in a cooling mode.

18. The method of operating the hydride bed water recovery system of claim 17, comprising the further steps of drawing the high temperature heat supply from the coolant loop return line and drawing the low temperature heat supply from the coolant feed line.

19. The method of operating the hydride bed water recovery system of claim 17, comprising the further step of controlling the flow of the process exhaust stream, and high and low temperature heat supplies to alternately place the first and second pairs of hydride beds in the regeneration and cooling modes.

* * * * *